(12) United States Patent
Ichino

(10) Patent No.: US 7,150,571 B2
(45) Date of Patent: Dec. 19, 2006

(54) OPTICAL APPARATUS

(75) Inventor: Kazushige Ichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/235,959

(22) Filed: Sep. 27, 2005

(65) Prior Publication Data

US 2006/0024049 A1    Feb. 2, 2006

Related U.S. Application Data

(62) Division of application No. 10/777,256, filed on Feb. 12, 2004, now Pat. No. 6,988,837.

(30) Foreign Application Priority Data

Feb. 24, 2003    (JP)    .............................. 2003-046179

(51) Int. Cl.
     *G03B 17/00*    (2006.01)
(52) U.S. Cl. .................................................... 396/448
(58) Field of Classification Search ................ 396/448; 359/511
See application file for complete search history.

(56) References Cited

U.S. PATENT DOCUMENTS

| 5,159,372 | A | 10/1992 | Nomura et al. ............. 396/448 |
| 5,486,889 | A | 1/1996 | Shintani ..................... 396/448 |
| 5,862,426 | A | 1/1999 | Ichino et al. ............... 396/448 |
| 6,419,407 | B1 * | 7/2002 | Nakazawa ................... 396/448 |
| 6,733,191 | B1 | 5/2004 | Oh et al. .................... 396/448 |
| 6,988,837 | B1 * | 1/2006 | Ichino ........................ 396/448 |

FOREIGN PATENT DOCUMENTS

| EP | 0 788 020 | 8/1997 |
| JP | H8 (1996)-234292 | 9/1996 |
| JP | H9 (1997)- 211536 | 8/1997 |
| JP | H10 (1998)-186453 | 7/1998 |

* cited by examiner

*Primary Examiner*—W. B. Perkey
(74) *Attorney, Agent, or Firm*—Cowan, Liebowitz & Latman, P.C.

(57) ABSTRACT

A camera capable of stabilizing the open state and closed state of barrier blades is disclosed. The camera comprises a lens barrel which holds a lens; and a barrier unit placed closer to the end of the lens barrel than a flange which is formed on the lens barrel and extends in the direction orthogonal to the optical axis, wherein the barrier unit has: a barrier member which opens/closes the front of the lens through a rotation operation; a barrier driving mechanism which drives the barrier member according to the operation of the lens barrel; and a partition plate which separates the barrier member from the barrier driving mechanism in the direction of the optical axis, and a shaft which supports the barrier member in a rotatable manner is formed on the flange.

6 Claims, 6 Drawing Sheets

PRIOR ART

PRIOR ART

PRIOR ART

OPTICAL APPARATUS

CROSS-REFERENCE TO RELATED APPLICATIONS

This application is a divisional of application Ser. No. 10/777,256, filed Feb. 12, 2004, now U.S. Pat. No. 6,988,837 the entire disclosure of which is hereby incorporated by reference.

BACKGROUND OF THE INVENTION

1. Field of the Invention

The present invention relates to a camera provided with a open/close type barrier mechanism which protects the lens front of a lens barrel and an optical apparatus.

2. Description of the Related Art

There are proposals of various types of a barrier mechanism which is provided in front of an image-pickup lens of a camera and causes barrier blades to perform an open/close operation in conjunction with operations (protruding and retracting) of the lens barrel in the direction of the optical axis. A basic structure of the barrier mechanism is shown in FIG. 4.

Two barrier blades 101 are supported by rotation shafts 102 in a rotatable manner through engagement of hole portions 101a with the rotation shafts 102. The rotation shafts 102 are provided on a base plate (not shown) (e.g., lens barrel, etc.). Then, driving pins 101b engage with notch portions 103a of a first driving ring 103.

The first driving ring 103 engages with a second driving ring 104 in a rotatable manner and is energized by an absorption spring 105 with respect to the second driving ring 104 in the direction indicated by arrow A (one turn direction). Here, since a hooking shaft 103b normally contacts a stopper 104a of the second driving ring 104 by spring force of the spring 105, the first driving ring 103 normally operates together with the second driving ring 104 as one unit.

The second driving ring 104 is held by a base plate (not shown) (e.g., lens barrel, etc.) in a rotatable manner and energized by an opening spring 106 in the direction indicated by arrow B.

One end of the opening spring 106 is fixed to a hooking shaft 107 and the hooking shaft 107 is provided on a base plate (not shown) (e.g., lens barrel, etc.). The first driving ring 103 and second driving ring 104 are rotated by the opening spring 106 in the direction indicated by arrow B and cause the barrier blades 101 to rotate in the opening direction (direction indicated by arrow C) as a result. Since the barrier mechanism is held by a base plate (not shown) (e.g., lens barrel, etc.), the barrier blades 101 are in an open state when the lens barrel protrudes and it is an image-pickup state. On the other hand, when the lens barrel retracts and it is in a non-image-pickup state, a cam face 104b of the second driving ring 104 contacts a cam-shaped protrusion 108 inside the camera and moves along the cam-shaped protrusion 108 and thereby causes the first driving ring 103 and second driving ring 104 to rotate in the direction indicated by arrow A. In this way, the barrier blades 101 rotate in the direction opposite to the direction indicated by arrow C to close the lens front.

When an external force in the direction indicated by arrow C is applied to the barrier blades 101 which are in a closed state, only the first driving ring 103 rotates in the direction indicated by arrow B against the spring force of the absorption spring 105.

In the above described structure, the structure in which the base plate and lens barrel house and hold the barrier mechanism will be explained using the cross-sectional views shown in FIG. 5 to FIG. 7. In these figures, the same members as those explained in FIG. 4 are assigned the same reference numerals.

In the structure shown in FIG. 5 (first conventional example), as disclosed in Japanese Patent Application Laid-Open No. H8 (1996)-234292 and Japanese Patent Application Laid-Open No. H10 (1998)-186453, the rotation shaft 102 and hooking shaft 107 (not shown) are directly provided in the lens barrel 109. Furthermore, the barrier mechanism is housed in the lens barrel 109 and a barrier cover 110 covers the front of the lens barrel 109.

The structure shown in FIG. 5 is simple and allows the barrier mechanism to be assembled from the front of the lens barrel 109.

The structure shown in FIG. 6 (second conventional example), as is disclosed in Japanese Patent Application Laid-Open No. H9 (1997)-211536 (corresponding to U.S. Pat. No. 5,862,426 and EP 0 788 020 A1), is constructed in such a way that the barrier driving mechanism other than the barrier blade 101 is assembled from the inner side (right side in FIG. 6) of the lens barrel 109. In this structure, a plate 112 is used to house the first driving ring 103 and second driving ring 104 within the lens barrel 109.

The structure shown in FIG. 7 (third conventional example) is a structure in which the barrier blades 101 and barrier driving mechanism are separated by a barrier base plate 113. Thus, the rotation shaft 102 is provided on a barrier base plate 113.

However, in the structure shown in FIG. 5, when the barrier blades 101 moves to the closing position, the second driving ring 104 may be pushed forward (left side in FIG. 5) in the lens barrel 109 by the cam-shaped protrusion 108, thereby preventing the movement of the barrier blades 101 and producing insufficient closing of the barrier blades 101.

On the other hand, in the structure shown in FIG. 6, since the part of the lens barrel 109 is located between the barrier blades 101 and barrier driving mechanism (especially, second driving ring 104) other than the barrier blades 101, even if the second driving ring 104 is pushed forward in the lens barrel 109 by the cam-shaped protrusion 108 as described above, the second driving ring 104 does not prevent the movement of the barrier blades 101.

However, since the barrier driving mechanism needs to be assembled from the inner side of the lens barrel 109 (right side in FIG. 6), it is difficult to imbed the barrier mechanism in the lens barrel 109.

In the structure shown in FIG. 7, since the barrier base plate 113 is placed between the barrier blades 101 and barrier driving mechanism (especially, the second driving ring 104), even if the second driving ring 104 is pushed in by the cam-shaped protrusion 108 as described above, the movement of the barrier blades 101 is not blocked. Moreover, the barrier mechanism can be assembled from the front side (left side in FIG. 7) of the lens barrel 109, and therefore it is also easy to imbed the barrier mechanism in the lens barrel 109.

However, the structure shown in FIG. 7 may make the open state and closed state of the barrier blades 101 unstable.

That is, the closed state and open state of the barrier blades 101 are affected by the relative positional relationship between the rotation shaft 102 and driving pin 101b, but if the rotation shaft 102 is provided on the barrier base plate 113, the barrier base plate 113 moves within the plane orthogonal to the optical axis due to backlash of engagement between the lens barrel 109 and barrier base plate 113, assembly error, part variations, etc., also causing the position of the rotation shaft 102 to change.

Thus, when the position of the rotation shaft 102 changes, the relative positional relationship between the rotation shaft 102 and driving pin 101b is not constant and the opening position and the closing position of the barrier blades 101 are not fixed to a predetermined position, and therefore the open state and the closed state of the barrier blades 101 become unstable.

SUMMARY OF THE INVENTION

One aspect of an optical apparatus of the present invention comprises a lens and a lens barrel which holds the lens. Here, the lens barrel has, in order from an object side, a barrier member which rotates around a first shaft and opens/closes the front of the lens, a partition plate and a barrier driving member which drives the barrier member through a second shaft, and the first shaft is united with the lens barrel.

The features of the optical apparatus of the invention will become more apparent from the following detailed description of a preferred embodiment of the invention with reference to the drawings.

DETAILED DESCRIPTION OF THE PREFERRED EMBODIMENTS

Figure 1:
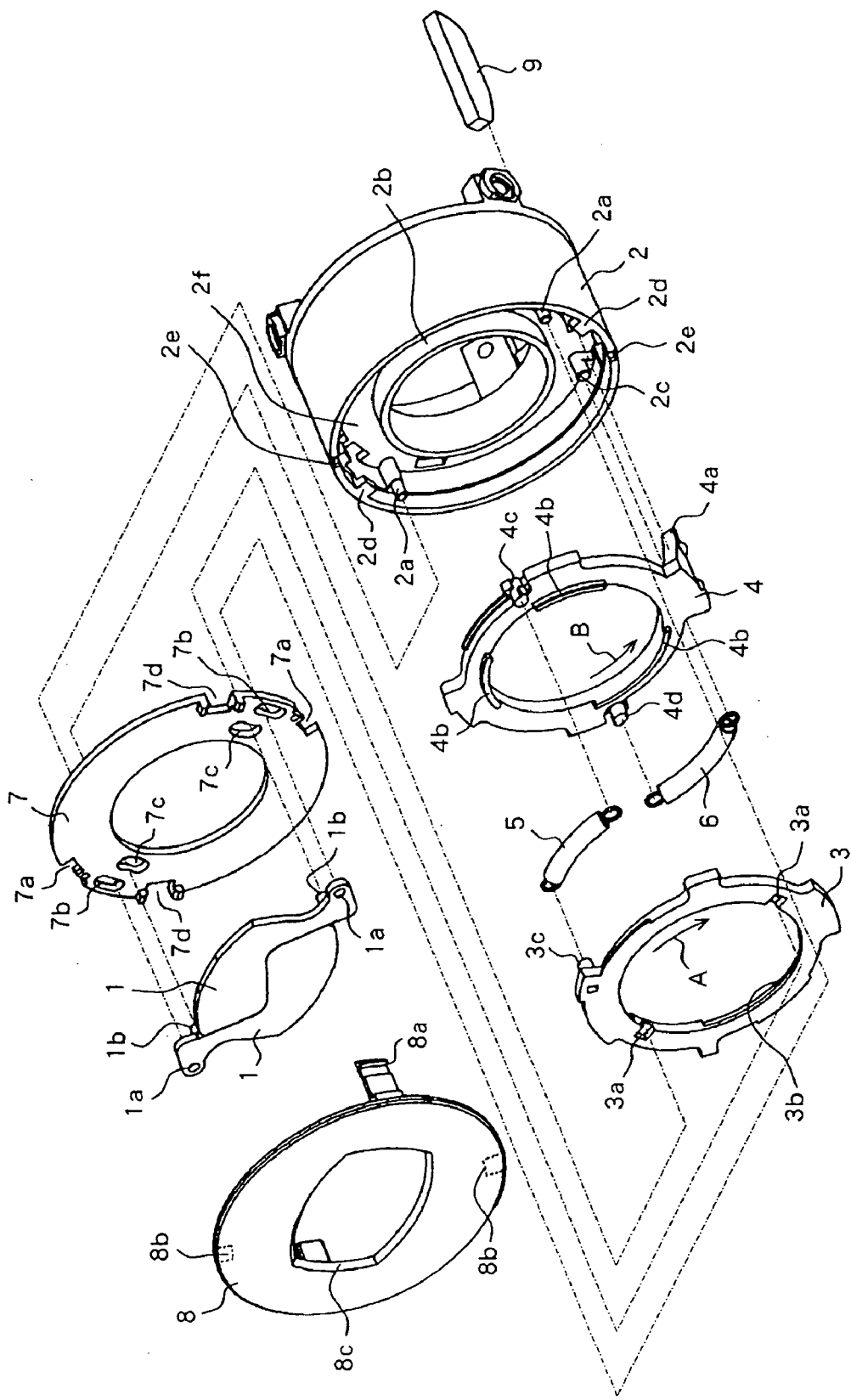
FIG. 1 is an exploded perspective view of a barrier mechanism according to an embodiment of the present invention.
Figure 2:
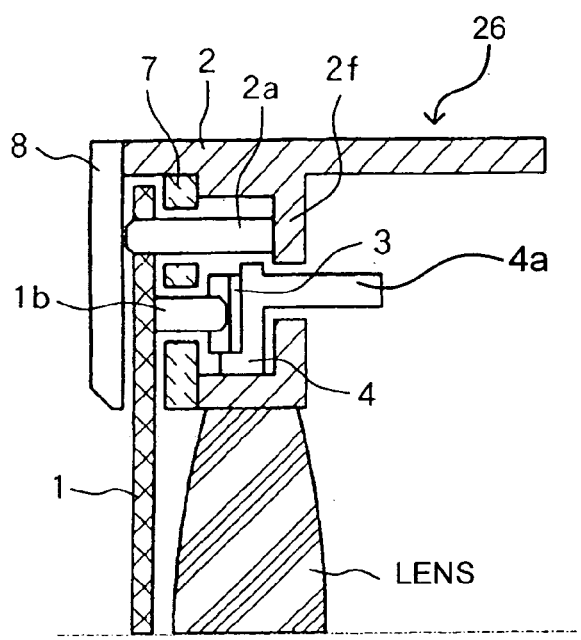
FIG. 2 is a partial cross-sectional view of a lens barrel according to the embodiment.
Figure 3:
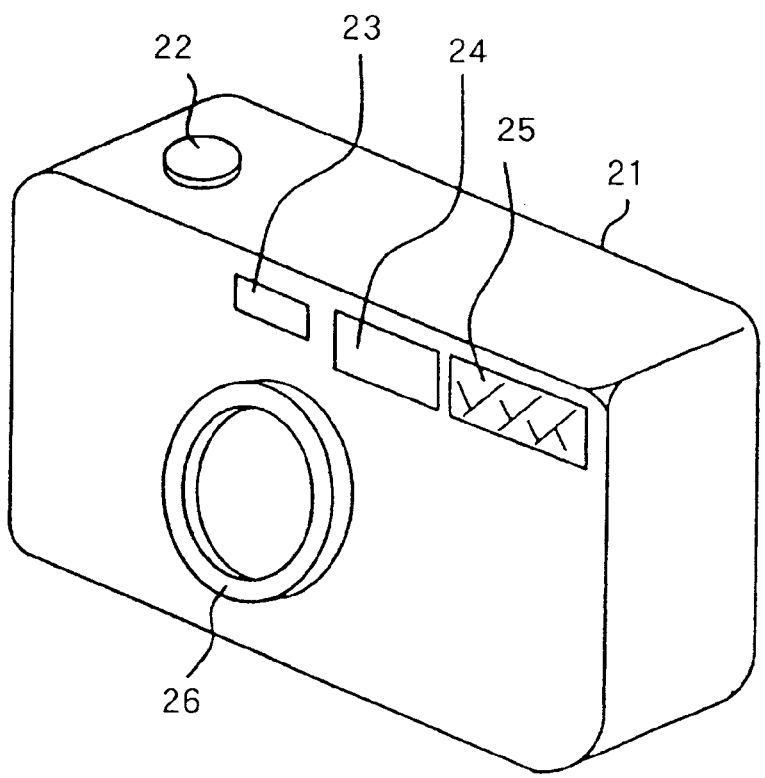
FIG. 3 is an external perspective view of a camera which is the embodiment.
Figure 4:
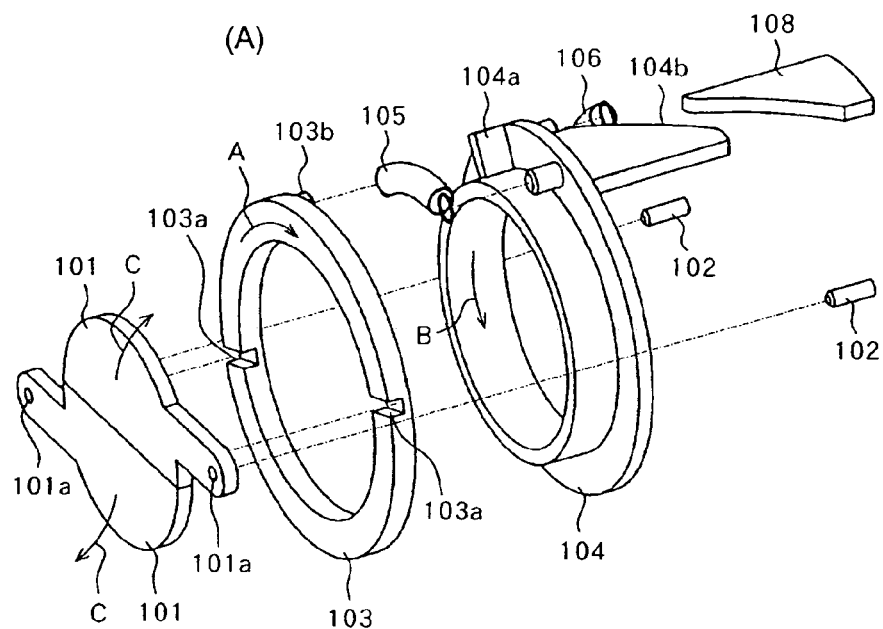
FIG. 4(A) is an exploded perspective view of a conventional barrier mechanism viewed from the front and FIG. 4(B) is an exploded perspective view viewed from the back.
Figure 4:
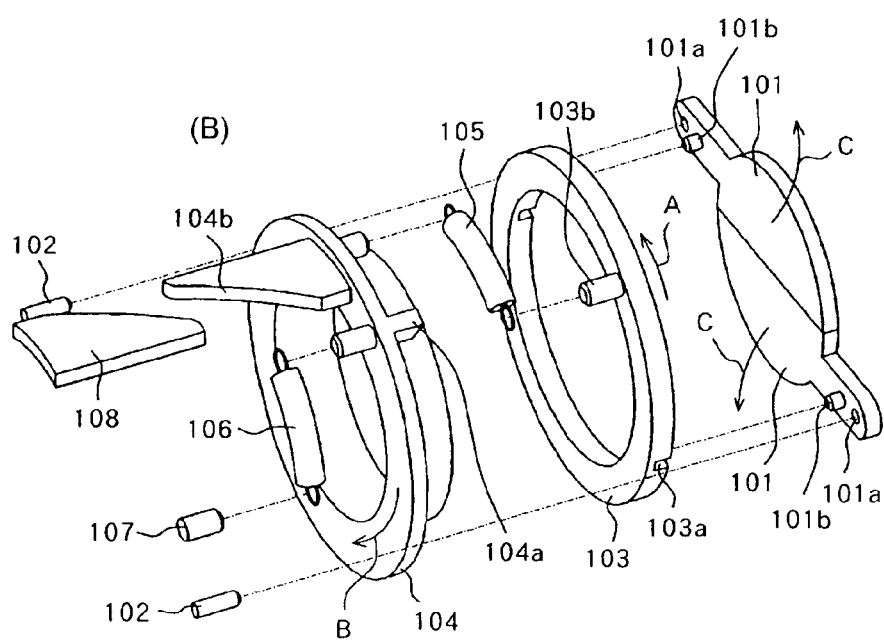
Figure 5:
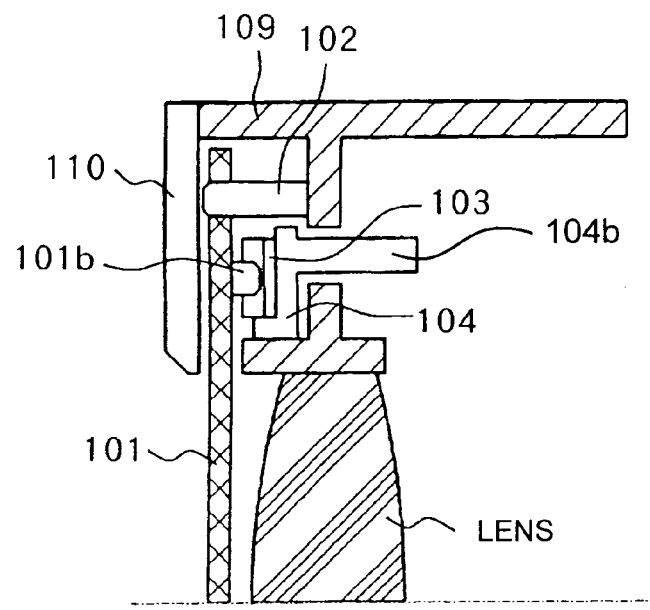
FIG. 5 is a partial cross-sectional view of the conventional lens barrel.
Figure 6:
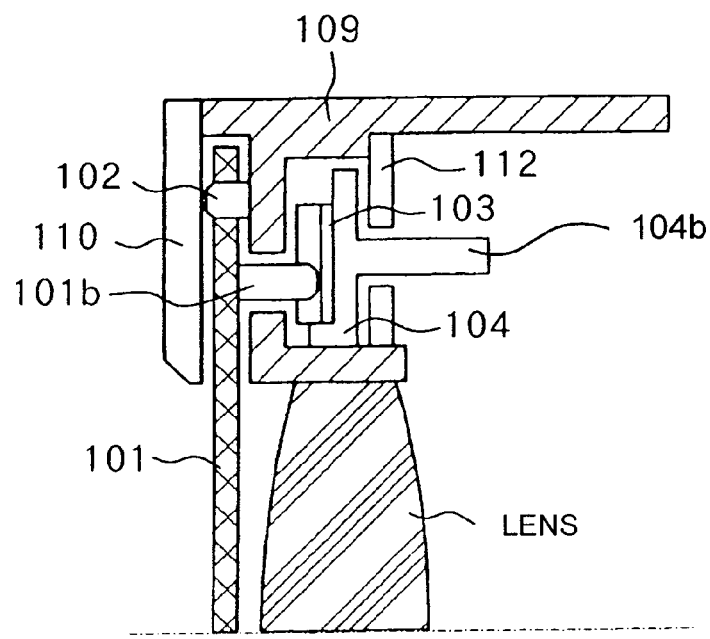
FIG. 6 is a partial cross-sectional view of the conventional lens barrel.
Figure 7:
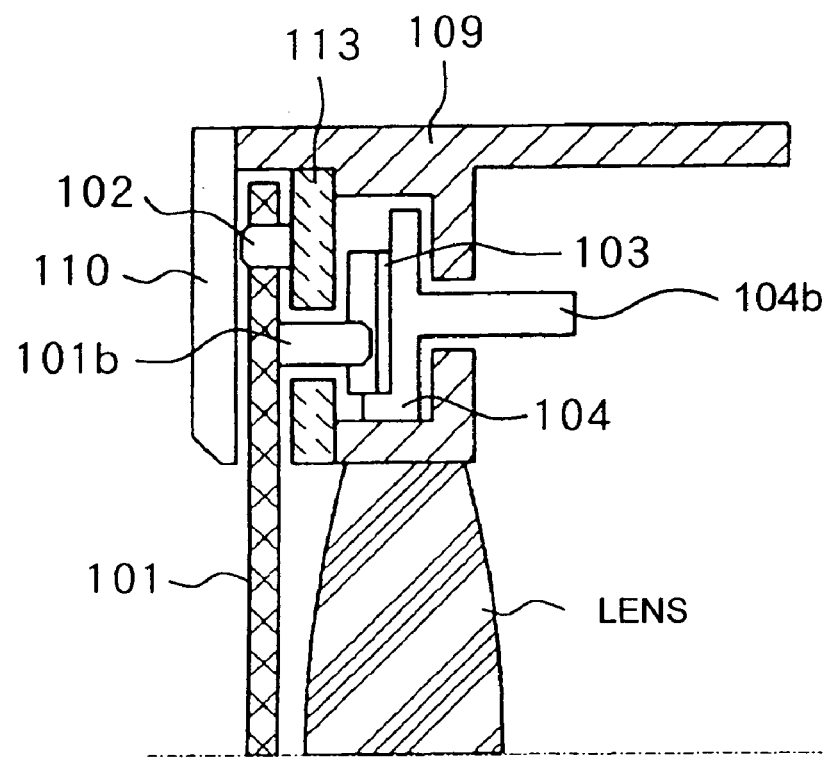
FIG. 7 is a partial cross-sectional view of the conventional lens barrel.

FIG. 1 and FIG. 2 show a barrier mechanism of a camera which is an embodiment of the present invention. FIG. 1 is an exploded perspective view of the barrier mechanism and FIG. 2 is a partial cross-sectional view of a lens barrel provided with the barrier mechanism. FIG. 3 is an external perspective view (schematic view) of the camera.

In FIG. 3, reference numeral 21 denotes a camera body which contains various members necessary for image taking. Reference numeral 22 denotes a release button. An image-taking preparation operation (photometric operation or focusing operation, etc.) is started by a half-depressing operation of the release button 22 and an image-taking operation (exposure to a film or an image-pickup element such as CCD, etc.) is started by a full-depressing operation of the release button 22.

Reference numeral 23 denotes a view finder unit for observing an object image and 24 denotes a light projection unit which projects AF fill light, etc. Reference numeral 25 denotes an electronic flash unit which irradiates an object with illumination light.

Reference numeral 26 denotes a lens barrel which holds an image-taking lens and can move (can protrude/retract) between a collapse state in which it is housed in the camera body 21 and an image-taking state in which it protrudes from the camera body 21. On the front of the lens barrel 26, a barrier mechanism which will be described later is provided.

Then, the structure of the barrier mechanism of this embodiment will be explained using FIG. 1 and FIG. 2.

Hole portions 1a are formed at the one end of the barrier blades (barrier member) 1. The barrier blades 1 are supported by rotation shafts 2a in a rotatable manner by allowing the hole portions 1a to engage with the rotation shafts 2a provided in a holding member 2 (part of the lens barrel 26). Furthermore, driving pins 1b are provided at positions closer to the optical axis than the hole portions 1a on the barrier blades 1 and engage with notch portions 3a of a first driving ring 3.

The first driving ring 3 engages with a second driving ring 4 in a rotatable manner. An absorption spring 5 energizes the first driving ring 3 with respect to the second driving ring 4 in the direction indicated by arrow A with one end of the absorption spring 5 engaging with a hooking shaft 3c of the first driving ring 3 and the other end engaging with a hooking shaft 4c of the second driving ring 4.

Here, by matching the phases of notch portions 3b formed in three parts in the circumferential direction of the first driving ring 3 and the phases of protrusions 4b formed in three parts in the circumferential direction of the second driving ring 4, it is possible to assemble the first driving ring 3 into the second driving ring 4.

At this time, the first driving ring 3 is energized in the direction indicated by arrow A by the spring 5, the end of the notch portions 3b are pressed against the end of the protrusions 4b, and therefore the first driving ring 3 and second driving ring 4 operate together as one unit except when an opening/closing operation of the barrier blades 1 is performed by external force as will be described later.

The second driving ring 4 is held by a lens holding portion 2b of the holding member 2 in a rotatable manner. An opening spring 6 energizes the second driving ring 4 in the direction indicated by arrow B with one end of the opening spring 6 engaging with a hooking shaft 4d of the second driving ring 4 and the other end engaging with the hooking shaft 2c of the holding member 2.

The first driving ring 3, second driving ring 4, absorption spring 5 and opening spring 6 are housed and held in the holding member 2 by being pressed by a barrier base plate (partition plate) 7 from the front of the lens barrel 26 (right side in FIG. 2).

Here, the barrier base plate 7 is fixed by bayonet lugs 2d provided in the holding member 2. That is, in order to assemble the barrier base plate 7 into the holding member 2, the barrier base plate 7 is attached to the holding member 2 by matching the phases of the bayonet lugs 2d and the phases of notch portions 7a provided in the barrier base plate 7 first and then the barrier base plate 7 is fixed to the holding member 2 by rotating the barrier base plate 7 clockwise (direction indicated by arrow A).

At this time, the rotation shafts 2a of the holding member 2 penetrate through hole portions (recess portion) 7b formed in the barrier base plate 7 and support the barrier blades 1 in a rotatable manner. It is also possible to form notch portions (recess portion) obtained by notching the perimeter of the barrier base plate 7 instead of through hole portions 7b.

Furthermore, the barrier base plate 7 is provided with escape hole portions 7c so that the driving pins 1b of the barrier blades 1 can engage with the notch portions 3a of the first driving ring 3. These escape hole portions 7c is formed like an elongated hole and secure an moving space of the driving pins 1b in a rotation operation of the barrier blades 1.

As the procedure for actually assembling the barrier mechanism into the holding member 2, the second driving ring 4, opening spring 6, absorption spring 5 and first driving ring 3 are assembled into the holding member 2 sequentially and then the barrier base plate 7 is assembled into the holding member. Then, the barrier blades 1 are assembled and covered with the barrier cover 8.

Elastic lugs 8a are formed in the barrier cover 8 and the barrier cover 8 is fixed to the holding member 2 with the elastic lugs 8a engaging with the holding member 2. At this time, the elastic lugs 8a engage with rotation stopper notch portions 7d formed on the perimeter of the barrier base plate 7.

Furthermore, protrusions 8b provided on the rear face of the barrier cover 8 engage with notch portions 2e provided in the front of the holding member 2. This represses the barrier cover 8 from coming off the holding member 2 and also represses it from rotating around the optical axis. Then, the barrier cover 8 is fixed to the holding member 2, which represses the barrier base plate 7 from rotating around the optical axis.

In this embodiment, as shown in FIG. 2, the barrier mechanism is located closer to the end of the holding member 2 (left side in FIG. 2) than an end 2f formed on the inner surface of the holding member 2, and therefore it is possible to incorporate the barrier mechanism from the front of the holding member 2. This makes it possible to easily assemble the barrier mechanism (lens barrel).

Here, the end 2f is formed at an proximal position with respect to the barrier blades 1 in the lens barrel 26 and extends to the inner side of the holding member 2, that is, extends toward the image-taking optical axis. Furthermore, the end 2f has a plane orthogonal to the optical axis.

In the above described structure, the barrier mechanism incorporated from the front of the lens barrel 26 moves together with the holding member 2 as one unit according to the protruding/retracting operation of the lens barrel 26 in the direction of the optical axis.

When the lens barrel 26 protrudes and is in an image-taking state, the barrier blades 1 are withdrawn from an opening 8c formed in the center of the barrier cover 8 and then remain open state. This allows a light flux from an object to go into the lens barrel 26.

On the other hand, when the lens barrel 26 retracts from the image-taking state into a collapse state, a cam face 4a of the second driving ring 4 contacts a cam-shaped protrusion 9 provided in the camera body 21 according to the retracting operation of the lens barrel 26. Then, the second driving ring 4 rotates in the direction indicated by arrow A (direction opposite to the direction indicated by arrow B) against the spring force of the opening spring 6 through the engagement between the cam face 4a and cam-shaped protrusion 9.

When the second driving ring 4 rotates in the direction indicated by arrow A, the first driving ring 3 rotates in the direction indicated by arrow A by receiving the spring force of the absorption spring 5, the barrier blades 1 rotate around the rotation shaft 2a through the engagement between the notch portions 3a and driving pins 1b and covers the opening 8c.

When the lens barrel 26 protrudes from a collapse state into an image-taking state, the engagement between the cam face 4a and cam-shaped protrusion 9 is released according to the protruding operation of the lens barrel 26. At this time, the second driving ring 4 rotates in the direction indicated by arrow B by receiving the spring force of the opening spring 6 and the first driving ring 3 rotates in the direction indicated by arrow B (direction opposite to the direction indicated by arrow A).

When the first driving ring 3 rotates in the direction indicated by arrow B, the barrier blades 1 rotate around the rotation shafts 2a through the engagement between the notch portions 3a and driving pins 1b and withdraw from the opening 8c into an open state.

When the barrier blades 1 are in a closed state, if an external force is applied to the barrier blades 1 in the opening direction of the barrier blades 1, only the first driving ring 3 rotates in the direction indicated by arrow B against the spring force of the absorption spring 5.

As shown in FIG. 2, in this embodiment, it is possible to incorporate the barrier mechanism from the front of the lens barrel 26 and thereby easily assemble the barrier mechanism.

Furthermore, since the barrier blades 1 and barrier driving mechanism having the second driving ring 4, opening spring 6, absorption spring 5 and the first driving ring 3, are placed sandwiching the barrier base plate 7, even if the second driving ring 4 (cam face 4a) contacts the cam-shaped protrusion 9 and is pushed in to the front side of the lens barrel 26, the movement (especially the closing operation) of the barrier blades 1 is not blocked.

That is, since the displacements of the barrier base plate 7 and the barrier cover 8 in the direction of the optical axis are repressed, the space for the movement of the barrier blades 1 is secured.

Furthermore, in this embodiment, the rotation shafts 2a are fixed to the holding member 2, and therefore even if the barrier base plate 7 moves within the plane orthogonal to the optical axis with respect to the holding member 2 for reasons such as engagement backlash, assembly errors or parts variations, etc., the positions of the rotation shafts are never shifted and the open state and closed state of the barrier blades 1 never become unstable.

Figure 8:
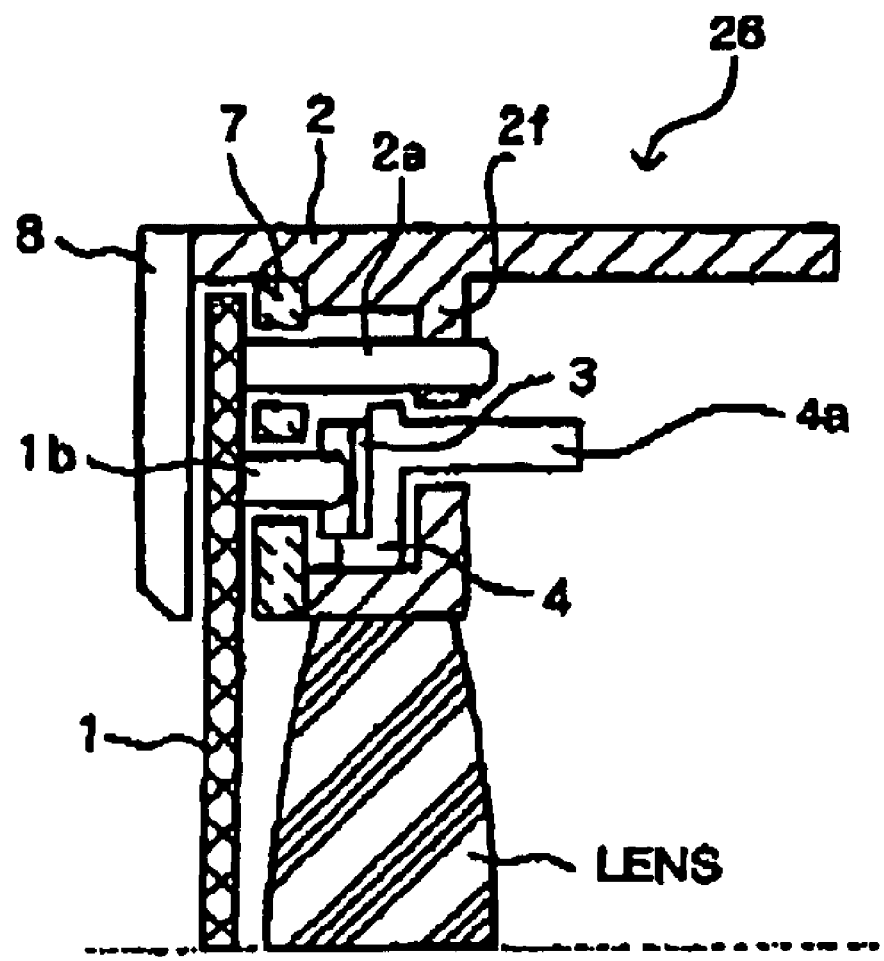
FIG. 8 is a partial cross-sectional view of a lens barrel according to an alternative embodiment of the present invention.

In this embodiment, the hole portions 1a are formed in the barrier blades 1 and the rotation shafts 2a are formed in the holding member 2 to cause the hole portions 1a to engage with the rotation shafts 2a, but the reverse structure may also be used. That is, it is also possible to form rotation shafts in the barrier blades 1 and form hole portions which engage with the above described rotation shafts in the holding member 2, as shown in FIG. 8.

Furthermore, in this embodiment, the barrier blades 1 are driven using the barrier driving mechanism having the first driving ring 3, second driving ring 4, absorption spring 5 and opening spring 6, but any structure may be used if it is at least the structure which causes the barrier blades 1 to move between the open position and the closed position. In this case, the barrier driving mechanism is separated from the barrier blades by the barrier base plate 7 and the rotation shafts of the barrier blades is provided in the lens barrel. Therefore, it is possible to achieve the same purpose as this embodiment.

While preferred embodiment has been described, it is to be understood that modification and variation of the present invention may be made without departing from scope of the following claims.

What is claimed is:

1. An optical apparatus comprising:
a lens;
a lens barrel which holds the lens and has a first shaft;
a barrier member which rotates around the first shaft;
a partition plate; and
a barrier driving member which drives the barrier member through a second shaft,
wherein the barrier member, the partition plate and the barrier driving member are arranged in order from an object side; and
wherein the first shaft is united with the lens barrel on the opposite side of the barrier member with respect to the partition plate.

2. An optical apparatus comprising;
a lens barrel which holds a lens;
a partition plate;
a protective member which rotates and opens/closes the object side of the lens; and
a driving pin and a rotation shaft which are molded in the protective member,
wherein,
the driving pin rotates the protective member and the rotation shaft engages with a hole portion provided in the lens barrel on the opposite side of the barrier member with respect to the partition plate.

3. The optical apparatus according to claim 2, further comprising a rotatable driving ring which has a notch portion engaging with the driving pin.

4. The optical apparatus according to claim 3, wherein the driving pin moves such that the baffler member rotates during the rotation of the driving ring.

5. The optical apparatus according to claim 2,
wherein the rotation shaft is united with the lens barrel on die opposite side of the barrier member with respect to the partition plate.

6. The optical apparatus according to claim 2, wherein the length of the hole portion provided in the lens barrel is larger than the thickness of the protective member.

* * * * *